United States Patent [19]
Secola

[11] 3,797,900
[45] Mar. 19, 1974

[54] BEARING ASSEMBLY
[75] Inventor: Anthony J. Secola, Hartford, Wis.
[73] Assignee: Chrysler Corporation, Highland Park, Mich.
[22] Filed: Aug. 16, 1972
[21] Appl. No.: 281,253

[52] U.S. Cl. .............................................. 308/236
[51] Int. Cl. ........................................... F16c 36/06
[58] Field of Search ............. 308/190, 15, 236, 189

[56] References Cited
UNITED STATES PATENTS
1,617,085  2/1927  Specht .............................. 308/190
2,641,517  6/1953  Meadows ........................... 308/190
2,913,284  11/1959 Zankl ................................... 308/15

FOREIGN PATENTS OR APPLICATIONS
598,018  2/1948  Great Britain ...................... 308/190

Primary Examiner—Charles J. Myhre
Assistant Examiner—Frank Susko

[57] ABSTRACT

An arrangement providing positive retention of a bearing on a shaft; the bearing is forced over a specially sized shoulder on the shaft by momentary deformation to a seat and is positively held there.

10 Claims, 3 Drawing Figures

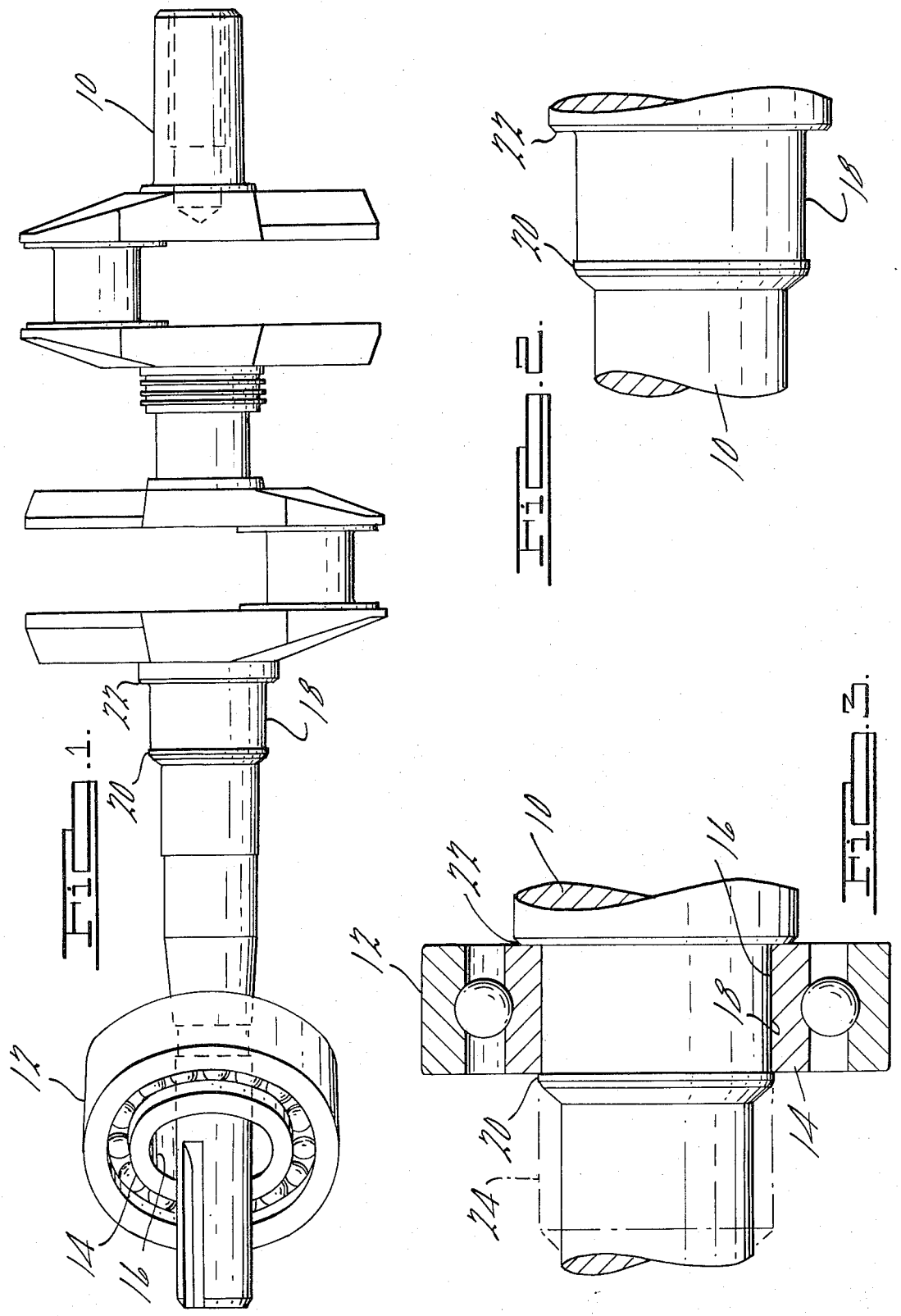

BEARING ASSEMBLY

BACKGROUND

This invention specifically relates to the assembly of bearing on the crank shaft of outboard engines. However, it is applicable to bearing assemblies generally wherein a bearing is to be held on a shaft.

In outboard engines the main bearing, which is carried by the crankshaft, positions the shaft in the engine because the outer race is positively retained axially in the crankcase housing bore. It is common in the art to force or "press fit" the bearing on the shaft. The crankshaft is often subjected to forces which tend to displace it relative to the bearing. Also, the tension resulting from press fitting causes metal fatigue in the bearing. Because of the reliance on the press fit of the bearing inner race on the crankshaft for holding the shaft position in the crankcase and its shortcomings, there is a need for more positive retention of the bearing to the crankshaft.

Typically, bearings for use in this and similar design situations are selected with relatively high internal clearance and are pressed on the crankshaft with a maximum allowable press to secure proper running clearance and adequate fatigue life of the race. Taking full advantage of this does not assure adequate axial holding capacity to prevent slippage of the crankshaft in the bearing due to vibrations or excessive loads, such as those experienced when removing the flywheel from the shaft, this usually being accomplished by a series of hammer blows to the end of the shaft.

Other bearing assemblies, in which a shaft or journal member is press fitted into an annular bearing, suffer similar retention problems. This is particularly true not only with regard to outboard engines but with crankshaft mountings in lawnmower engines and other two stroke cycle engines as well as in other bearing-journal combinations such as automotive wheel bearings. This invention is generally applicable to all design situations of the foregoing type.

Conventional means of positive retention such as the use of collars, keys, retaining rings and liquid locking agents are impractical in this and similar design situations due to bulk, added stress concentration or inadequate holding capacity.

This invention provides a solution to this problem which is simple and inexpensive.

SUMMARY OF THE INVENTION

The "snap fitting" of annular members in recesses of various types is generally old. However, such annular members have heretofore been made of readily deformable, thin materials such as spring steel or plastic. This invention applies the concept to relatively massive structures which are not ordinarily considered to be deformable, such as annular bearing races, and is particularly applicable to the crankshaft main bearing assembly of outboard engines and the like.

Such crankshafts will, according to this invention, have shoulder means or the like forming a recessed seat thereon for receiving the inner portion, such as the inner race, of a ball bearing. The shoulder means is sized such, relative to the inner portion of the bearing, that the bearing can be forceably expanded when pushed over the shoulder means to reach the seat without exceeding the elastic limit of the bearing material or permanently deforming it. A simple low cost arrangement for the improved positive retention of a bearing, particularly a ball bearing, on a journal, particularly a crankshaft, by using a specially sized shoulder on the journal, which momentarily takes full advantage of the elasticity of the bearing during assembly is thus provided.

Another advantage of this construction is that the bearing is maintained securely in a fixed position on the shaft with less tension and/or radial stress than is necessary when using a press fit. Fatigue life being directly proportional to the tension to which a piece of metal is subjected, the higher the tension the shorter the fatigue life. Using the construction provided herein instead of a press fit allows the bearing bore to be sized relative to the shaft so as to minimize tension and radial stress once the bearing is seated. The momentary tension experienced during assembly even though greater than that experienced in press fitting does not affect fatigue life.

DESCRIPTION OF THE DRAWINGS

FIG. 1 is a plan view of a partially assembled bearing and a crankshaft.

FIG. 2 is a detailed view of the shoulder and seat portion of the crankshaft.

FIG. 3 is a detailed view of an assembled bearing and crankshaft, also showing an optional tool useful in assembling the bearing and crankshaft.

DESCRIPTION OF THE PREFERRED EMBODIMENT

FIG. 1 shows a ball bearing and crankshaft during assembly. A journal member, such as crankshaft 10, and an annular bearing means, such as ball bearing 12 including an inner portion such as race 14 defining a bore 16 therethrough are assembled by inserting the crankshaft through the bearing bore as shown and forcing the bearing to a seat 18 thereon.

Seat 18 is included on crankshaft 10 for receiving bearing 12 and preferably has an outside diameter similar to the inside diameter of bore 16 which is sized typically to produce line to line fits or interference fits depending on the bearing class allowance. The seat is preferably defined by shoulder means, such as an integral pair of spaced shoulders 20 and 22, which are preferably annular and extend continuously around the shaft like a collar as shown at 20 in FIGS. 1 and 2 and, as best shown in FIG. 2.

The outside diameter of the shoulder means can readily be made sufficiently larger than the diameter of seat 18 for the purposes of this invention. On typical ball bearings, presses up to 0.008 inch or more in diameter are practical depending on particular sizes. Much lower presses are practical however. Typically, the ball bearing used in an outboard engine will require a shoulder diameter of only about 0.002 to 0.004 inches larger than the diameter of seat 18 to accomplish mounting as shown in FIG. 3. Generally speaking the O.D. of the shoulder may range from about 0.1 to 0.8 percent, 0.4 percent being preferred, larger than the I.D. of the bearing bore.

Mounting is accomplished by simply forcing the bearing over shoulder 20 during which time the race momentarily expands due to its elasticity to allow its passage over the shoulder to the seat 18. It has apparently been mistakenly assumed in the art that, because bearings fail at low continuous stress levels, a much higher momentary stress as is experienced in passing over shoulder 20 to seat 18 is also not possible. Therefore this approach has not been seen heretofore.

For short shoulders, a tool 24 shown in phantom in FIG. 3, can be provided to help pilot the bearing during assembly. To assure long life of the tool its diameter can be made slightly smaller than that of the shoulder. The shoulder does not necessarily have to be uniformly round about the crankshaft but can extend out from only one point or area thereof. When "effective outside diameter" is used herein it is meant to encompass both structures.

The success of this design is enhanced by using a relatively hard journal shaft and bearing race to avoid galling of the bearing race and the journal. The bearing races themselves are normally hard enough, exceeding about $R_c$ 60 in hardness. The crankshaft or journal may be softer, down to about $R_c$ 35 and up to about $R_c$ 60, depending on the material. Specific sizes and material hardness will depend on the particular elements being assembled.

Having described preferred embodiments of the invention, what is claimed as an exclusive property right is defined as follows:

1. A bearing assembly comprising:
bearing means having an annular metal inner race portion defining a bore for receiving a journal member therethrough;
a journal member carrying the bearing means in a seat thereon, the seat being defined by shoulder means on the journal member, the effective outside diameter of the shoulder means being larger than the inside diameter of the bearing bore;
whereby, during assembly of the bearing means on the journal member, the inner race portion must be momentarily expanded, without exceeding its elastic properties by forceably passing it over the shoulder means to the seat without permanent deformation or fracture, the bearing being thereby mounted and positively retained on the journal member.

2. The assembly according to claim 1 wherein the shoulder means comprise annular spaced shoulders on the journal member and define the seat therebetween.

3. The assembly according to claim 1 wherein the journal member is an engine crankshaft.

4. The assembly according to claim 3 wherein the crankshaft is an outboard engine crankshaft.

5. A crankshaft-bearing assembly comprising:
bearing means having an inner mounting portion defining a bore for receiving a crankshaft therethrough,
a crankshaft inserted through the bore and receiving the bearing means in a seat thereon, the seat being defined by a pair of spaced retaining shoulders on the crankshaft, one of the shoulders having an effective diameter such that it is necessary to momentarily expand the mounting portion of the bearing means to force the bearing means past the shoulder to the seat during assembly.

6. The assembly according to claim 5 wherein the mounting portion is a one-piece annular member.

7. The assembly according to claim 5 wherein the retaining shoulders are annular.

8. The assembly according to claim 7 wherein the shoulders are integrally formed on the crankshaft.

9. The assembly according to claim 5 wherein the outside diameter of the shoulder is about 0.1 to 0.8 percent larger, 0.4 percent being preferred, than the inside diameter of the bearing means bore.

10. The assembly according to claim 5 wherein the bearing mounting portion is a material having a hardness of at least about $R_c$ 60 and the crankshaft is a material having a hardness of from about $R_c$ 35 to $R_c$ 60 whereby galling and permanent deformation are prevented.

* * * * *